Sept. 3, 1957 T. S. HERMAN 2,805,092
FASTENER FOR FILM REEL MAGAZINE COVERS
Filed April 2, 1954 2 Sheets-Sheet 1
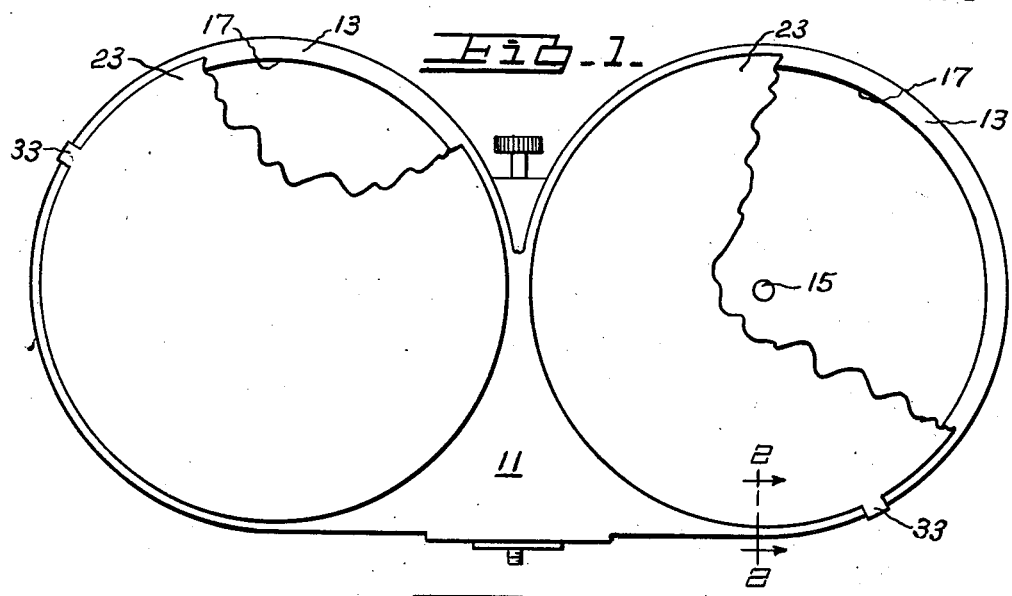
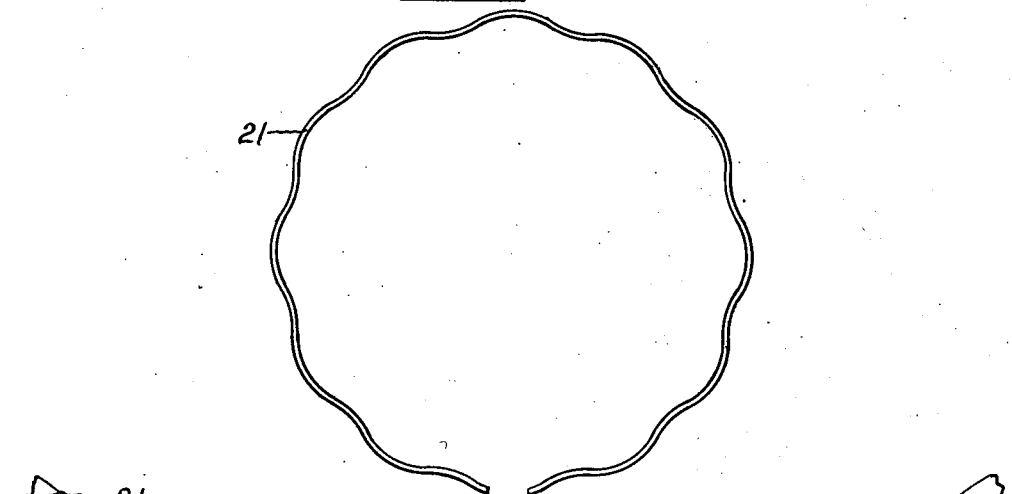
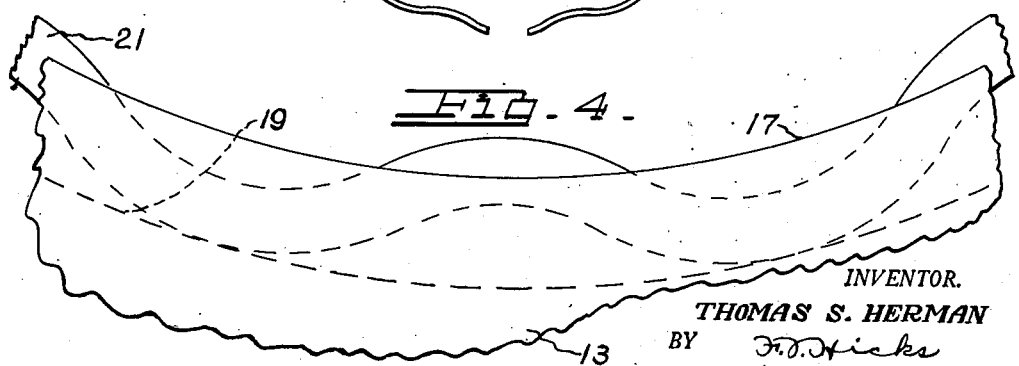
INVENTOR.
THOMAS S. HERMAN
BY
His Attorney

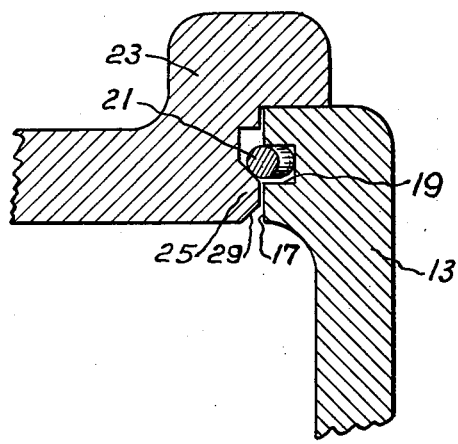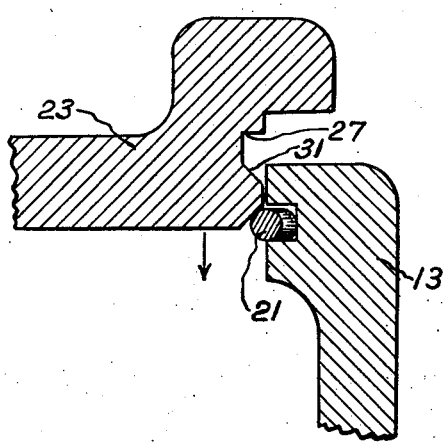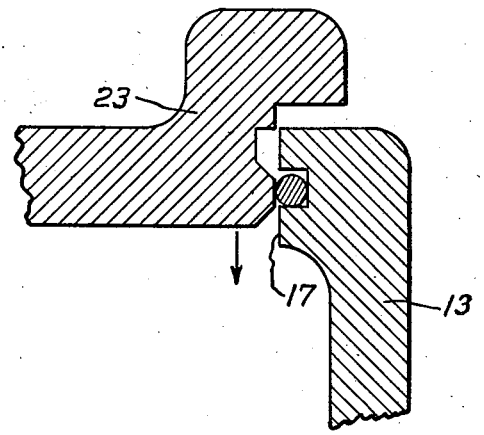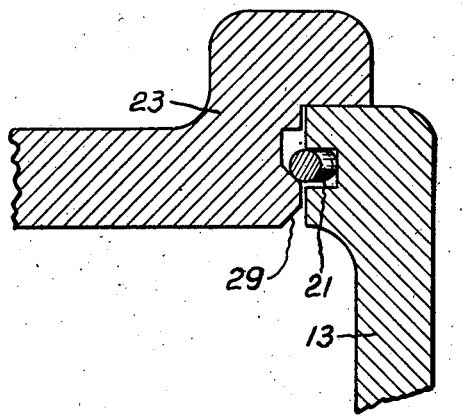
INVENTOR.
THOMAS S. HERMAN

2,805,092

FASTENER FOR FILM REEL MAGAZINE COVERS

Thomas S. Herman, Clarkston, Mich., assignor to Frederick P. Warrick Company, Clarkston, Mich., a partnership Application April 2, 1954, Serial No. 420,572

3 Claims. (Cl. 292—256.63)

The invention pertains to a film reel magazine assembly for use on motion picture cameras, recording cameras and like apparatus, and more particularly it relates to the arrangement of the covers and securing means therefor.

Covers for film reel chambers in the reel magazines are usually large disc-like members having the edges provided with threads which are adapted to be turned into threads provided in the openings of these chambers. As the covers are of large diameter it is difficult to fit the threads properly together so that it often happens that a false start is made causing the cover to become jammed. Frequently this results in serious injury to the threads. And in all cases it causes considerable waste of time and exhausts the patience of the operator. As these film reel magazines are usually loaded in a dark-bag the operator is in a very difficult situation if the cover jams and it has to be removed and re-started without any chance to observe the edges.

It is accordingly an object of the invention to provide cover securing means which will be easily and quickly engageable to hold the cover snugly installed in light excluding relation upon the reel chamber and which may be easily released when it is desired to remove the cover for loading or unloading the magazine.

It is also an object of the invention to provide improved reel magazine cover securing means which will be simple to manufacture.

Further objects and advantages are within the scope of the invention, such as relate to the arrangement, operation and function of the related elements of the structure, to various details of construction and to combinations of parts, elements per se, and to economies of manufacture and numerous other features, as will be apparent from a consideration of the specification in conjunction with the drawings disclosing specific embodiments of the invention, wherein similar reference characters are applied to corresponding parts throughout, and in which:

Fig. 1 is a side elevational view showing a double chamber film reel magazine provided with cover securing means in accordance with my invention and both of the covers being partially broken away to show internal details;

Fig. 2 is an enlarged fragmentary sectional view on line 2—2 on Fig. 1;

Fig. 3 is a plan view showing one of the resilient retainer rings;

Fig. 4 is an enlarged fragmentary view showing a portion of the retainer ring and in nature diagrammatic to show how it fits into and projects out of the ring groove in the chamber sidewalls; and Figs. 5, 6 and 7 are similar to Fig. 2 and diagrammatically illustrating how the cover retainer means operates to secure a cover snugly upon the reel chamber with a predetermined inwardly acting force, as the cover is pressed on.

Referring more particularly to Fig. 1, a conventional double chamber reel magazine 11 is shown having two chambers 13 for receiving two film reels (not shown) to be rotatively supported, one in each chamber. Such magazines are commonly integral castings, of light metal, enclosing chambers 13 of a flat cylindrical or drum shape and each having a circular aperture 17 opening from one side for conveniently receiving the film reel to be installed upon the rotary central support, in the usual manner. Each reel chamber 13 is provided with the usual centrally located rotary reel support or spindle 15 for conveniently receiving and supporting a film reel (not shown), in a well known manner.

As may be seen in Figs. 2 and 5, 6 and 7, and as represented by dotted lines in Fig. 1, in accordance with my invention, I recess the inner surface of the sidewall of the circular aperture to provide a ring groove 19 for holding resilient retainer means 21. The retainer means 21 may be made of spring steel into a generally circular form as an open ring to spring outwardly into the annular ring groove 19 in the sidewall of the aperture of the reel chamber.

The cover 23 is usually a disc-like casting of light metal made of a diameter larger than the diameter of the circular aperture 17 to fit flush thereover to exclude the light from the reel chamber. In accordance with my invention, the cover is provided with an inwardly projecting securing flange 25 of a smaller diameter which is sufficiently less than the diameter of the aperture 17 so that it will pass freely thereinto without binding therein. As the cover is installed, the resilient retainer means 21 binds against this securing flange. This permits easy quick installation of the cover and provides sufficient holding force to hold the cover snugly upon the reel chamber. To provide more positive locking force the securing flange 25 of the cover 23 is preferably provided with a locking groove 27 at the position to be cooperatively opposite to said ring groove 19 so that it receives a portion of the retainer ring for holding the cover installed.

As Figs. 3 and 4 show, the resilient retainer ring 21 is preferably distorted to provide waves in the plane of the ring. These waves in the retainer ring cause it to be partly within the ring groove 19 in the magazine sidewalls and partly projecting resiliently into the opening to engage the inwardly projecting annular securing flange 25 of the cover as it is installed. As may be seen in Figs. 2 through 7, the crests of the outward waves of the ring are disposed in the ring groove in the chamber aperture and press outwardly therein against the periphery or the bottom of the groove. At the same time the crests of the inwardly extending waves project inwardly into the aperture into which the securing flange 25 of the cover must be pressed to install the cover.

As may be seen more clearly in Figs. 2, 5, 6 and 7, the innermost or leading edge of the securing flange 25 of the cover is bevelled to provide an outwardly inclined surface 29 for pressing the resilient ring 21 outwardly into its groove 19 as the inner part of the inner securing flange enters, thus facilitating installation of the cover. The inner wall of this locking groove 27 is also bevelled to provide the annular inclined surface 31 which, when removing the cover, acts outwardly and presses the resilient ring 21 outwardly into the ring groove 19 to facilitate removal of the cover.

In operation, as illustrated in Fig. 5, insertion of the flange of the cover causes the outwardly inclined surface 29 on the inner edge of the securing flange of the cover to press the inwardly projecting wave crests of the resilient ring outwardly into the ring groove 19 in the sidewall of the aperture in the magazine. Finally the securing flange 25 of the cover reaches the position shown in Fig. 6 and the cover is readily pressed to its final inward position shown in Fig. 7. As it approaches this final position, the inclined surface 31 on the front side of the locking groove in the securing flange of the cover is engaged by the inwardly springing wave crests of the ring. This acts to snap the cover down to its final snug closed position and also continues to hold the cover firmly in this snug closed position.

When a cover is removed it is necessary to apply a predetermined force as determined by the strength of the retainer spring and the angle of the bevelled surfaces at the inner side of the locking groove 27 in the cover securing flange. This presses the spring ring out into its ring groove and the cover is readily removed. To facilitate removal covers are provided with laterally projecting finger tabs 33, as may be seen in Fig. 1. These may be grasped by the fingers or pried up by a suitable tool to facilitate applying sufficient force to overcome the locking force of the spring ring to remove the cover.

It is apparent that within the scope of the invention modifications and different arrangements may be made other than herein disclosed, and the present disclosure is illustrative merely, the invention comprehending variations thereof.

What I claim as new and desire to secure by Letters Patent of the United States is:

1. In a film reel magazine, the combination comprising a substantially cylindrical chamber having a circular opening in one side thereof for inserting a film reel, said chamber being light excluding, said chamber having an annular groove in the side wall of said opening, a ring of undulating wave-like configuration having crests which lie in the same plane, said ring being made of spring wire having a substantially constant cross sectional configuration, said ring being mounted in said groove in the wall of said opening in said chamber with some of said crests projecting into said groove and others of said crests extending radially inwardly of said opening and away from said groove, said chamber having a radially extending sealing surface adjacent the periphery of the opening therein, and a cover member for providing a light-excluding seal, said cover having a complementary sealing surface engaging said sealing surface on said chamber and cooperating therewith to form a light-excluding seal, said cover having a portion thereof extending axially into said opening and having a diameter less than the diameter of said opening, said axially extending portion having an annular groove along the periphery thereof adjacent said groove in the wall of said opening, said groove in said cover having a surface thereof axially furthermost from said sealing surfaces inclined axially away from said sealing surface and radially outwardly, the radially inwardly extending crests of said ring bearing against said inclined surface on the cover and applying an axial force on said cover urging the sealing surface on the cover into light-excluding sealing relationship to the sealing surface on the chamber.

2. In a film reel magazine, the combination comprising a substantially cylindrical chamber having a circular opening in one side thereof for inserting a film reel, said chamber being light excluding, said chamber having an annular groove in the side wall of said opening, a ring of undulating wave-like configuration having crests which lie in the same plane, said ring being made of spring wire having a substantially constant cross sectional configuration, said ring being mounted in said groove in the wall of said opening in said chamber with some of said crests projecting into said groove and others of said crests extending radially inwardly of said opening and away from said groove, said chamber having a radially extending sealing surface adjacent the periphery of the opening therein, and a cover member for providing a light-excluding seal, said cover having a complementary sealing surface engaging said sealing surface on said chamber and cooperating therewith to form a light-excluding seal, said cover having a portion thereof extending axially into said opening and having a diameter less than the diameter of said opening, said axially extending portion having an annular groove along the periphery thereof adjacent said groove in the wall of said opening, said groove in said cover having a surface thereof axially furthermost from said sealing surfaces inclined axially away from said sealing surfaces and radially outwardly, the axial distance between the sealing surfaces and the portion of said inclined surface of said groove in the cover which is contacted by the radially inwardly extending crests of said ring being less than the axial distance between the sealing surfaces and the axially furthermost surfaces of said crests of said ring, the diameter of the circle on which said contacting portions of said crests lie being greater than the diameter of the circle defined by said portions of said crests when the cover is removed, the radially inwardly extending crests of said ring bearing against said inclined surface on the cover and applying an axial force on said cover urging the sealing surface on the cover into light-excluding sealing relationship to the sealing surface on the chamber.

3. The combination set forth in claim 2 wherein said axially projecting portion of said cover is provided with a second inclined surface spaced from said groove axially a greater distance from said sealing surface on said cover than said groove, said second surface being inclined axially away from said sealing surfaces and radially inwardly, said second surface contacting said ring during placement of said cover in position on the cylindrical chamber and thereby facilitating the placement of the cover in position.

References Cited in the file of this patent

UNITED STATES PATENTS

| 1,442,440 | Messinger | Jan. 16, 1923 |
| 1,451,320 | Bodnar | Apr. 10, 1923 |
| 1,765,239 | Meurling | June 17, 1930 |
| 1,847,228 | Smith | Mar. 1, 1932 |
| 2,061,177 | Tasker | Nov. 17, 1936 |
| 2,064,028 | Moyer | Dec. 15, 1936 |
| 2,322,949 | Lux | June 29, 1943 |
| 2,441,131 | Blackman | May 11, 1948 |

FOREIGN PATENTS

| 275,904 | Switzerland | Sept. 1, 1951 |